US009660755B2

(12) United States Patent
Hurley et al.

(10) Patent No.: US 9,660,755 B2
(45) Date of Patent: May 23, 2017

(54) AUTOMATED NODE LEVEL FIBRE AUDIT

(71) Applicant: Ciena Corporation, Hanover, MD (US)

(72) Inventors: Dane Hurley, Ottawa (CA); Scott Kohlert, Nepean (CA)

(73) Assignee: Ciena Corporation, Hanover, MD (US)

( * ) Notice: Subject to any disclaimer, the term of this patent is extended or adjusted under 35 U.S.C. 154(b) by 170 days.

(21) Appl. No.: 13/654,954

(22) Filed: Oct. 18, 2012

(65) Prior Publication Data

US 2014/0112658 A1 Apr. 24, 2014

(51) Int. Cl.
*H04B 10/08* (2006.01)
*H04J 14/02* (2006.01)
*H04B 10/07* (2013.01)
*H04B 10/073* (2013.01)

(52) U.S. Cl.
CPC .......... *H04J 14/0227* (2013.01); *H04B 10/07* (2013.01); *H04B 10/0731* (2013.01); *H04J 14/0212* (2013.01); *H04J 14/0217* (2013.01); *H04J 14/0219* (2013.01)

(58) Field of Classification Search
USPC ......................................................... 398/16
See application file for complete search history.

(56) References Cited

U.S. PATENT DOCUMENTS

| | | | | |
|---|---|---|---|---|
| 6,005,696 A * | 12/1999 | Joline | ................... | H04B 10/07 370/241 |
| 6,223,219 B1 * | 4/2001 | Uniacke | .................. | H04L 12/24 707/999.008 |
| 6,477,566 B1 * | 11/2002 | Davis | .................. | H04L 41/0233 707/999.01 |
| 6,763,192 B1 * | 7/2004 | Jagannathan | ...... | H04Q 11/0005 398/51 |
| 8,127,042 B1 * | 2/2012 | Davis | ...................... | H04L 41/12 709/227 |
| 2007/0115456 A1 * | 5/2007 | Wisseman | ............. | H04B 10/00 356/73.1 |
| 2010/0202777 A1 * | 8/2010 | Liu | ...................... | H04J 14/0204 398/83 |
| 2010/0266275 A1 * | 10/2010 | Xia | .................... | H04B 10/0773 398/16 |
| 2011/0013908 A1 * | 1/2011 | Gazzola | ................. | H04L 41/12 398/48 |
| 2011/0200324 A1 * | 8/2011 | Boertjes | ............. | H04J 14/0212 398/16 |
| 2013/0025375 A1 * | 1/2013 | Goldner | ................. | G01V 1/226 73/655 |

(Continued)

OTHER PUBLICATIONS

Ramaswami et al., Optical Networks, Nov. 27, 2009, Morgan Kaufmann, 3rd Edition, pp. 471-474.*

(Continued)

*Primary Examiner* — Ken N Vanderpuye
*Assistant Examiner* — Jai Lee
(74) *Attorney, Agent, or Firm* — Clements Bernard Walker PLLC; Christopher L. Bernard; Lawrence A. Baratta, Jr.

(57) ABSTRACT

A method of automated testing and evaluation of a node of a communications network, the method comprising: a management computer interacting with the node to discover fiber trails within the node that can be safely tested; and the management computer interacting with the node to test at least continuity of each identified fiber trail that can be safely tested.

19 Claims, 8 Drawing Sheets

(56) References Cited

U.S. PATENT DOCUMENTS

| | | | |
|---|---|---|---|
| 2013/0202289 A1* | 8/2013 | Tang | H04B 10/07 398/17 |
| 2013/0259474 A1* | 10/2013 | Ji | H04J 14/0212 398/48 |
| 2013/0322868 A1* | 12/2013 | Wellbrock | H04J 14/0209 398/16 |

OTHER PUBLICATIONS

Ramaswami et al., Optical Networks, 2009, Morgan Kaufmann, 3rd Ed., pp. 471-474.*

* cited by examiner

AUTOMATED NODE LEVEL FIBRE AUDIT

CROSS-REFERENCE TO RELATED APPLICATIONS

This is the first application filed in respect of the present invention.

FIELD OF THE INVENTION

The present application relates generally to management of communications systems, and more specifically to techniques for automated node level fibre audit in a communications system.

BACKGROUND

FIG. 1 is a block diagram schematically illustrating principal elements of a reconfigurable optical add/drop multiplexer (ROADM) 2 known in the art. The ROADM 2 may be connected to send and receive optical dense wavelength division multiplexed (DWDM) signals. In FIG. 1, this connection is represented by an optical fiber span pair 4 connected to respective broadband optical ports 6 of the ROADM 2. However, it will be appreciated that, in many applications, optical routing and switching devices will be connected between the ROADM 2 and the fiber span pair 4, as will be described in greater detail below.

As may be seen in FIG. 1, the ROADM 2 may be provided as a set of modules 8-12 interconnected by optical fiber intra-node connections 14-16. In the embodiment of FIG. 1, the modules forming the ROADM 2 comprise an amplifier module 8, a second-stage MUX/DeMUX module 10; and one or more first-stage MUX/DeMUX modules 12. The interconnections 14, 16 between these modules define a Drop path and a Add path of the ROADM 2.

The Drop path comprises a receive amplifier 18 in the amplifier module 8 for amplifying an inbound dense wavelength division multiplexed (DWDM) light (received through the input Broadband port 6a; a wavelength selective switch (WSS) 20 in the second-stage MUX/DeMUX module 10 for routing any selection of channels of the received DWDM light to any of a set of output fibers; and a power divider 22 of the first-stage MUX/DeMUX module 12 for receiving a respective one of the selections of channels, and supplying the light of these channels to a plurality of coherent receivers 24 (only one shown in FIG. 1).

The Add path generally mirrors the Drop path, by combining individual channel signals from a plurality of transmitters 26 into an outbound dense wavelength division multiplexed (DWDM) light that is output though the output broadband port 6b. In the embodiment of FIG. 1, the Add path comprises a respective power combiner 28, 30 in each of the first- and second-stage MUX/DeMUX modules 12, 10, and a launch amplifier 32 in the amplifier module 8. The first-stage power combiner 28 operates to combine light from a plurality of transmitters 26 (only one is shown in FIG. 1) onto a single fiber that is connected to the second-stage MUX/DeMUX module 10. When each of the transmitters 26 is tuned to emit light corresponding to a respective different narrow band wavelength channel, the light passed to the second-stage MUX/DeMUX module 10 will be a wavelength division multiplexed (WDM) light comprising each of the transmitted wavelength channels. The second-stage power combiner 30 operates to combine a plurality of channels' light (from respective first-stage power combiners 28) for transmission through the output broadband port 6b.

The Add path amplifier 32 is coupled to output broadband port 6b, and operates to amplify the DWDM signal for transmission through downstream optical components, such as the optical fiber span 4.

The block diagram of FIG. 1 only shows a single first-stage MUX/DeMUX module 12 connected to the second-stage MUX/DeMUX module 10. However, it will be appreciated that there can be any number of first-stage MUX/DeMUX modules 12, up to the maximum number of inputs supported by the second-stage MUX/DeMUX module 10.

FIG. 2 is a block diagram illustrating a representative network node comprising a Directionally Independent Access (DIA) shelf 34 optically coupled to three fiber spans 4a-c via respective Optical Transmission Sections (OTSs) 36a-c. As may be seen in FIG. 2, the DIA 34 comprises the ROADM 2 of FIG. 1 coupled to a wavelength selective switch (WSS) 38 which is programmed to selectively switch channels between the ROADM 2 and each of the three OTSs 36. This arrangement combines Rx/Tx tunability with optical switching to enable the DIA 34 to add/drop channels to/from DWDM signals in any of three fiber spans 4a-c. The system shown in FIG. 2 has only one DIA 34 connected to three OTSs 36, whereas a typical network node may have more than one DIA shelf 34, each of which is connected to two or more OTSs 36.

With the introduction of multi degree ROADMs, combined with multiple DIAs and OTSs, the number and complexity of optical connections within a node becomes very high. For example, an 8 degree ROADM with two colorless DIA shelves can have over 600 fiber connections.

As nodal fiber configurations become increasingly complex, mechanical solutions are expected to become prevalent in order to improve fiber management. Many of these mechanical solutions will involve parallel optical cables (fiber ribbon cables). In this case it is critical that all fiber connections are validated before any traffic is placed on the system. For example, once a single fiber in a ribbon cable is in use, cleaning or moving any other fiber in the ribbon cable will not be possible without impacting traffic. This implies that all fiber connections must be thoroughly checked at the time of installation, even though they may not be used until a later date.

The increasing level of complexity in the physical fibering increases the likelihood that mistakes will be made during the installation and commissioning of optical equipment.

When deploying and commissioning optical systems, manual procedures are typically used to test and evaluate intra- and inter-node fiber connections. Although this provides the user of the equipment with the ability to evaluate physical connections, the testing is also prone to human error. As the complexity of the system increases, so too does the likelihood of errors in testing and evaluation process. Mistakes made during the commissioning and testing of equipment can go undetected, and result in failed service turn-ups for customers, which results in service delays and increased cost. Similar issues can be seen throughout the life cycle of optical equipment. Mistakes made during circuit pack replacements, regular maintenance, or capacity expansions can go undetected and result in service outages.

Techniques that enable improved speed and accuracy of testing and evaluation of optical equipment remain highly desirable.

SUMMARY

An aspect of the present invention provides a method of automated testing and evaluation of a node of a communications network, the method comprising: a management computer interacting with the node to discover fibre trails within the node that can be safely tested; and the management computer interacting with the node to test at least continuity of each identified fibre trail that can be safely tested.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 8:
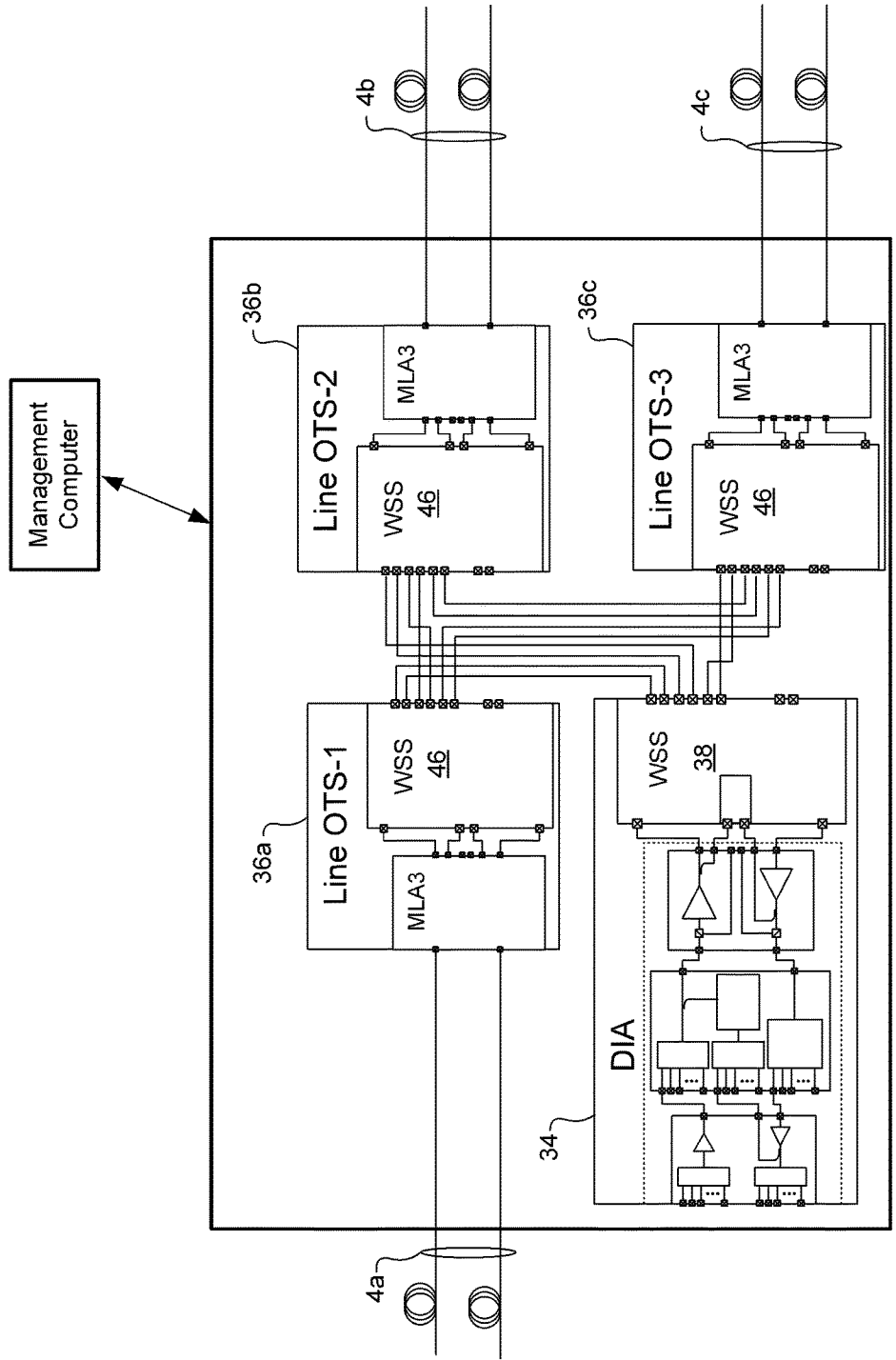
FIG. 8 is a block diagram schematically illustrating interaction between a management computer and a network node, in accordance with an aspect of the present invention.

The present application provides techniques for automated node-level fiber testing and evaluation. The methods described below, may be implemented using a computer executing suitable software stored on a memory of the computer. For example, during system layout and test (SLAT), a service technician may connect a management computer to a network node (see FIG. 8), and trigger execution of software that interacts with the network node to perform the desired testing and evaluation processes. As another example, the node's own management computer may execute software implementing the automated testing and evaluation methods to enable a "self-test" of the node's internal connectivity and performance. In a still further example, a central management computer operated by a network service provider may execute software implementing the automated testing and evaluation methods to enable remote testing of the node's internal connectivity and performance. Other arrangements are also possible.

Figure 3:
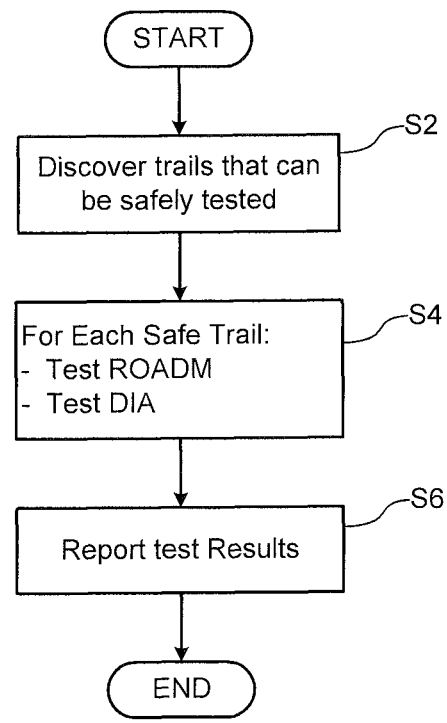
FIG. 3 is a flow chart illustrating a representative method in accordance with an aspect of the present invention.

Referring to FIG. 3, in a representative embodiment, network node equipment is examined (at step S2) to discover fiber trails (paths) that can be safely tested. Fibre trails carrying active wavelengths may be safely tested, provided that the active wavelengths themselves are not subject to interference in the course of such testing. So-called "dark" fibre trails (i.e. fibre trails that are connected but not carrying any active wavelengths) can only be tested by adding light to them. Dark fibre trails may be considered to be safe for testing only if adding a light source to the fibre trail will not impact other in service wavelengths. That is, the injected light source used for testing must be a distinct wavelength, or if ASE light is used, it must be prevented from multiplexing with in-service wavelengths. For each safe fiber trail, connections through the ROADM and the DIA can be tested (at step S4) for continuity and losses. The test results for each fiber trail can be compiled into a report (at step S6), which may be used (for example by a service technician) to correct any faults found in the node.

Figure 4:
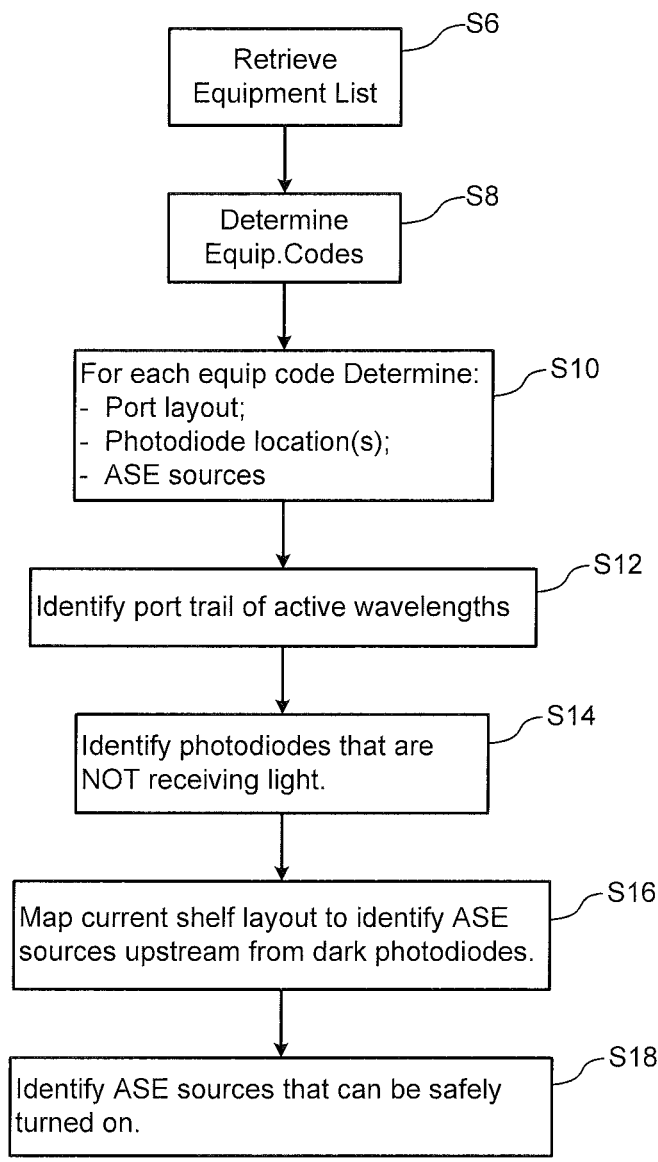
FIG. 4 is a flow chart illustrating a representative discovery method in accordance with an aspect of the present invention.

FIG. 4 illustrates a representative process for discovering fiber trails that can be safely tested. At a first step (S6), the network node is queried to obtain a listing of equipment (such as, for example, shelves and cards) installed within the node. This information is commonly stored in a database associated with the network node, and may include information uniquely identifying each piece of equipment, as well as one or more respective codes (such as part and model numbers) associated with each piece of equipment. This information can then be used (at steps S8 and S10) to identify port layout and addresses, photodiode (receiver and/or Optical Performance Monitoring (OPM)) locations and addresses, and sources of Amplified Spontaneous Emission (ASE), (such as for example, optical amplifiers 18, 32, FIG. 1) in each piece of equipment. In some embodiments, this information can be obtained by querying the network node. In other cases, this information can be obtained by querying one or more databases which may be accessed through a network such as the internet.

Figure 2:
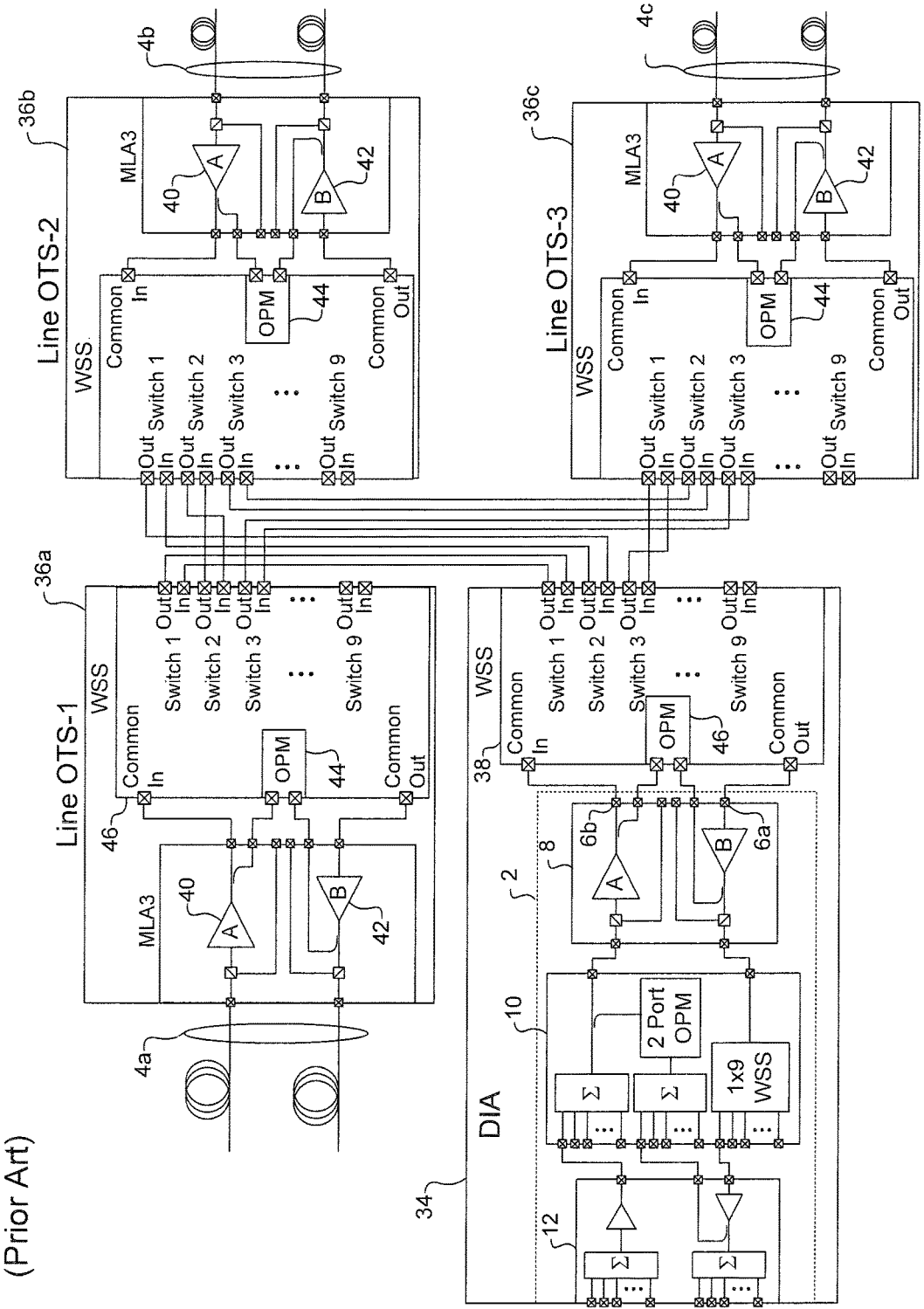
FIG. 2 is a block diagram schematically illustrating a representative network node incorporating the ROADM of FIG. 1.

The network node can also be queried to identify (at step S12) the port trail of any active wavelengths. For example, the status of the DIA WSS 38 (FIG. 2) can be retrieved from the network node and analysed to identify each wavelength that is being switched through the WSS 38. These wavelengths may be considered as active wavelengths, and cannot be disrupted during testing of the network node. The status of the WSS 38 and the known port layout of each piece of equipment can then be used to identify the respective sequence of ports (ie the port trail) traversed by each active wavelength. Any photodiodes (eg receivers 24 or OPM circuits) receiving light of an active wavelength can thus be determined. Conversely, any photodiodes that are not receiving an active wavelength, can also be identified (at step S14). These "dark" photodiodes may be used during subsequent testing of the network node. It should be noted that photodiodes that terminate light from active wavelengths can be used non intrusively to calculate fiber loss, by querying the involved photodiodes to obtain the received optical power levels. This information can be readily used to confirm at least the connectivity of the lit fibre trails. In addition, fibre loss can be calculated by comparing the optical power of light detected at a photodiode to an "expected" power level, which can be determined by retrieving information on the current composition of traffic on the relevant fiber (for example, loss=number of active wavelengths*expected power of each wavelength−power measured at photodiode). The discussion below will focus on the testing of dark fibre trails, since this is generally more complicated.

The known port layout and addresses, photodiode locations and addresses, and ASE sources can then be used to map the current shelf layout (at step S16), and identify ASE sources upstream of each "dark" photodiode. Of these ASE sources, any sources that are connected to the known port trail of an active wavelengths cannot be safely used for testing, because such use may disrupt signaling in the active wavelengths. Once these unsafe ASE sources have been identified, any other ASE sources may are identified (at step S18) as being available for use in testing the node.

The process described above with reference to FIG. 4, yields a map of equipment and fiber trails in the node that can be safely tested without disrupting active wavelengths. Representative testing procedures are described below with reference to FIGS. 5 and 6.

Figure 5:
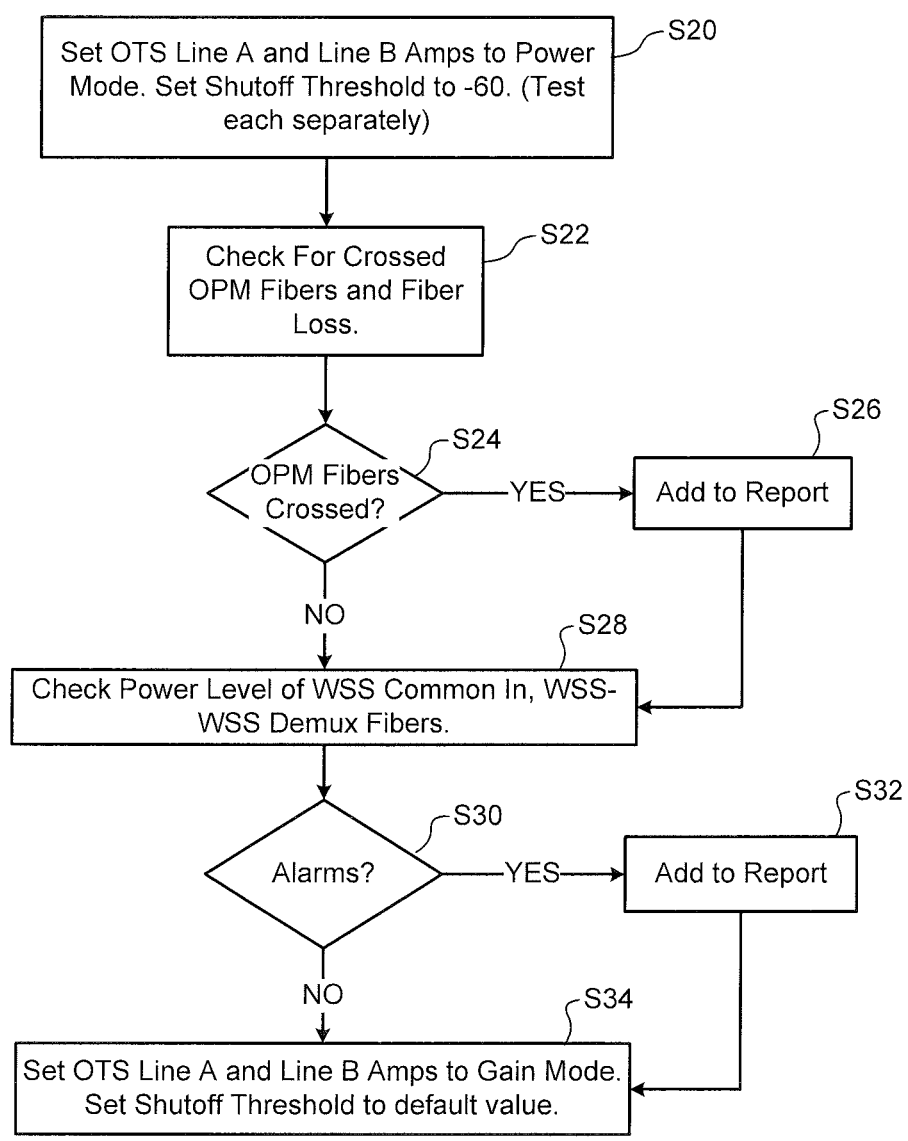
FIG. 5 is a flow chart illustrating a representative testing method in accordance with an aspect of the present invention.

FIG. 5 illustrates a representative method for automated testing of an OTS 36 within a network node. As may be appreciated, this process may be suitable for testing OTS cards that have been installed in a shelf, but which are currently connected to "dark" fiber spans 4. At a first step (S20), the OTS amplifiers 40 and 42 (FIG. 2) are set to "power mode", so as to generate ASE at their respective outputs. The ASE light emitted from each amplifier can then be used to test (at S22) for faults in the OPM fiber connections. For example, by supplying power to each of the OTS amplifiers 40 and 42 separately, the OPM 44 can be checked to determine that light is being received from each amplifier through the correct port. This allows crossed fiber connections to be detected. In addition, the optical power levels detected by the OPM 44 can be compared to an allowable tolerance value to detect excessive losses in the OPM fiber connections.

If a crossed fiber connection or excessive fiber losses are detected, then information detailing the problem(s) are added to a test report (at step S26). This information may, for example, include information identifying the OTS card 36 in which the faulty OPM connections are found, as well as information identifying the nature of the fault (such as improper connection or excessive losses, for example).

Once the OTS OPM fiber connections have been checked, the OTS WSS 46 can be queried (at S28) to obtain the detected optical power levels at the Common-In, and Switch-Out ports. If the WSS returns an alarm condition, then corresponding information is added to the test report (at S32).

Once the OTS testing is complete, the OTS amplifiers 40 and 42 can be set into a "Gain Mode" (step S34), so as to minimize ASE at their outputs.

Figure 6:
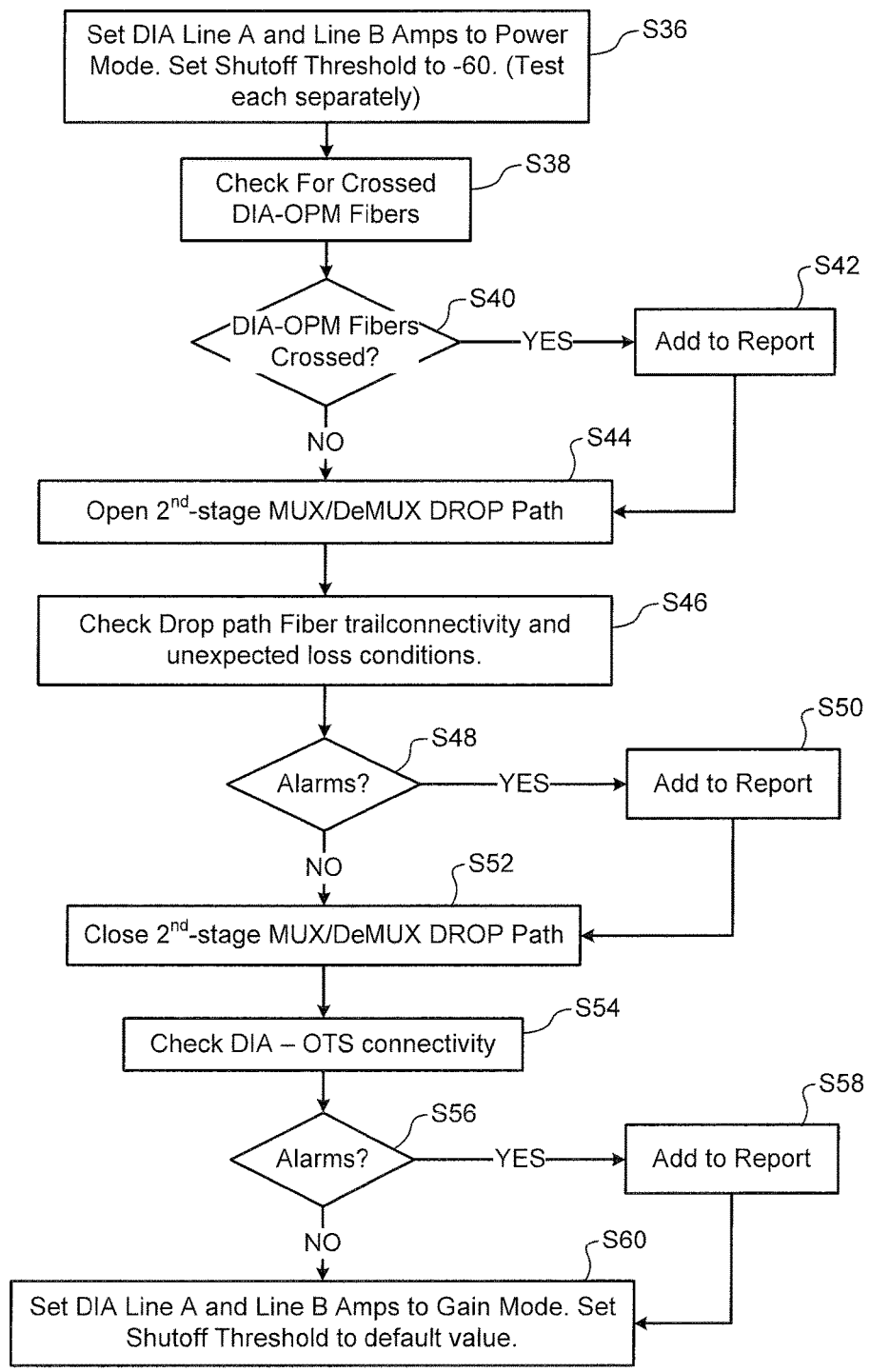
FIG. 6 is a flow chart illustrating a representative testing method in accordance with an aspect of the present invention.

FIG. 6 illustrates a representative method for automated testing of a DIA 34 within a network node. As may be appreciated, this process may be suitable for testing DIA cards that have been installed in the node, but which are not currently ADDing or DROPing active wavelength channels. At a first step (S36), the optical amplifiers 18 and 32 (FIG. 1) are set to "power control mode", so as to generate ASE at their respective outputs. The ASE light emitted from each amplifier can then be used to test (at S38) for faults in the OPM fiber connections. For example, by supplying power to each of the amplifiers 18 and 32 separately, the DIA OPM 46 can be checked to determine that light is being received from each amplifier through the correct port. This allows crossed fiber connections to be detected. In addition, the optical power levels detected by the DIA OPM 46 can be compared to an allowable tolerance value to detect excessive losses in the OPM fiber connections.

If a crossed fiber connection or excessive fiber losses are detected, then information detailing the problem(s) is added to the test report (at step S42). This information may, for example, include information identifying the DIA card 34 in which the faulty OPM connections are found, as well as information identifying the nature of the fault (such as improper connection or excessive losses, for example).

Once the DIA OPM fiber connections have been checked, the DROP path of the second-stage MUX/DeMUX module 10 can be opened (at step S44) to enable testing of DIA and ROADM DROP path fiber trails (at step S46) for connectivity and unexpected (or excessive) loss conditions.

Figure 1:
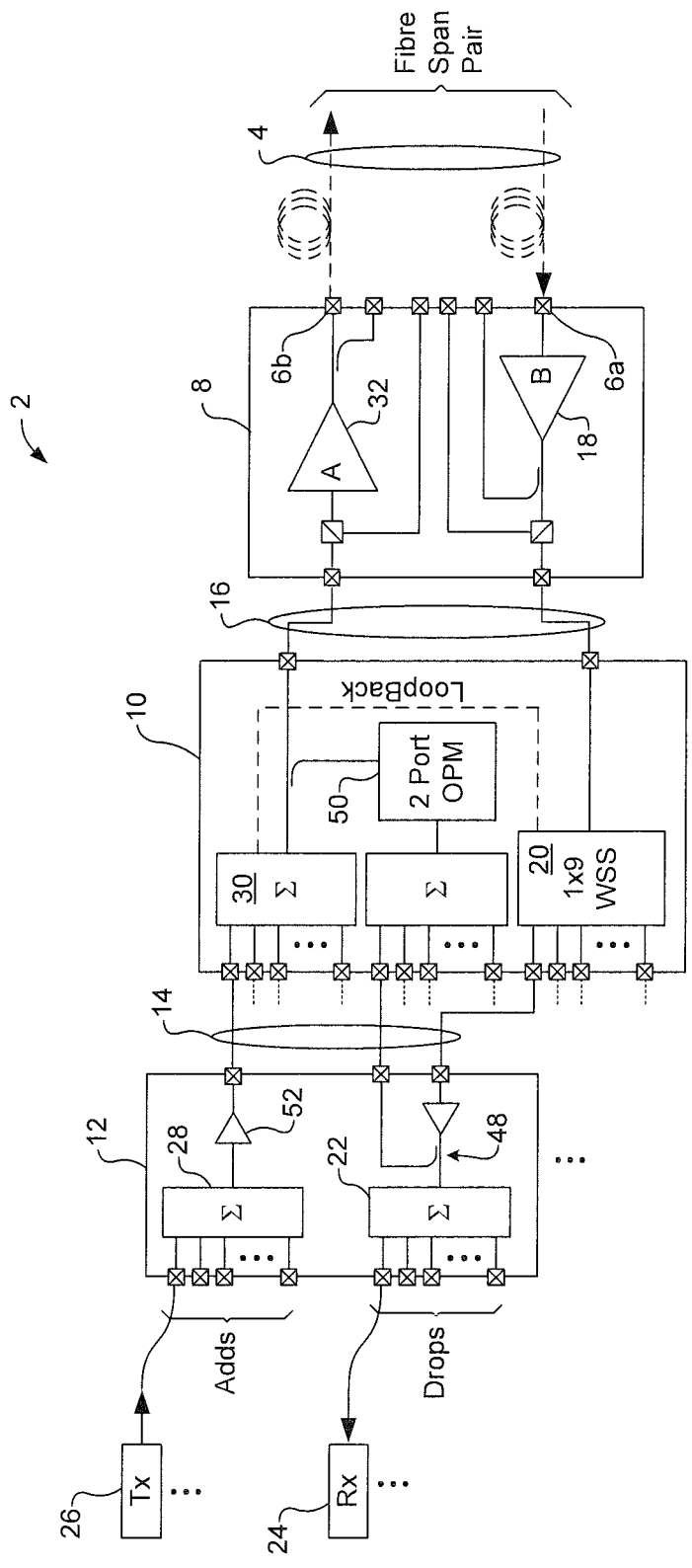
FIG. 1 is a block diagram schematically illustrating a reconfigurable optical add/drop multiplexer (ROADM) known in the art.

For example, referring to FIG. 1, the ROADM WSS 20 can be queried to obtain the detected optical power levels at the Common-In, and Switch-Out ports. If the WSS 20 does not return any alarm conditions, proper connectivity in the DROP path between the amplifier module 8 and the second-stage MUX/DeMUX module 10 is confirmed. In this case, the WSS 20 can be controlled to switch ASE light to a selected first-stage MUX/DeMUX module 12. Detection of this light by receivers 24 connected to the selected first-stage MUX/DeMUX module 12 confirms proper connectivity in the DROP path. Conversely, failure of the receivers 24 connected to the selected first-stage MUX/DeMUX module 12 to detect ASE light from the DROP path amplifier 18 indicates a crossed or missing fiber connection in the DROP path, and detected by the receivers 24 connected to that module. In addition, some of the ASE light from the DROP path amplifier 18 will also be tapped (at 48, FIG. 1) and routed to a 2-port OPM 50 in the second-stage MUX/DeMUX module 10. By this means, the OPM fiber connections between the first and second stage MUX/DeMUX modules 10 and 12 can be tested for continuity. Finally, the receivers 24 and the 2-port OPM 50 can be queried to obtain information indicative of the optical power level of the ASE light received from the received light DROP path amplifier 18. These power levels can then be compared with predetermined tolerance levels to detect an unexpected or excessive loss condition. Any errors or alarm conditions detected during the DROP path continuity and loss checks described above can then be added to the test report (at S50).

Once the DROP path fiber trails have been tested, the DROP path of the second-stage MUX/DeMUX module 10 can be closed (at step S52) and ADD path connectivity between the DIA and each OTS tested (at step S54), using ASE light emitted by the ADD path amplifier 32. For example, the DIA WSS 38 can be queried to obtain the detected optical power levels at the Common-In, and Switch-Out ports. Similarly, the WSS OPM 46 can be queried to obtain the detected optical power level of light from the amplifier 32. If the DIA WSS 38 and OPM 46 do not return any alarm conditions, proper connectivity in the ADD path between the amplifier module 8 and the DIA WSS 38 is confirmed. In this case, the WSS 38 can be controlled to switch ASE light to a selected OTS 36, and the corresponding WSS queried to obtain the optical power level of the Switch-In port to which the DIA should be connected. If no alarms conditions are detected from the OTS WSS, then proper connectivity in the ADD-path between the DIA and the selected OTS is confirmed. On the other hand, if any alarm conditions are returned from either of the DIA or OTS WSSs, then information regarding these alarms is added (at step 58) to the test report.

Upon completion of the DIA tests above, the DIA amplifiers 18 and 32 can be set into a "Gain Control Mode" (step S60), so as to minimize ASE at their outputs.

Figure 7:
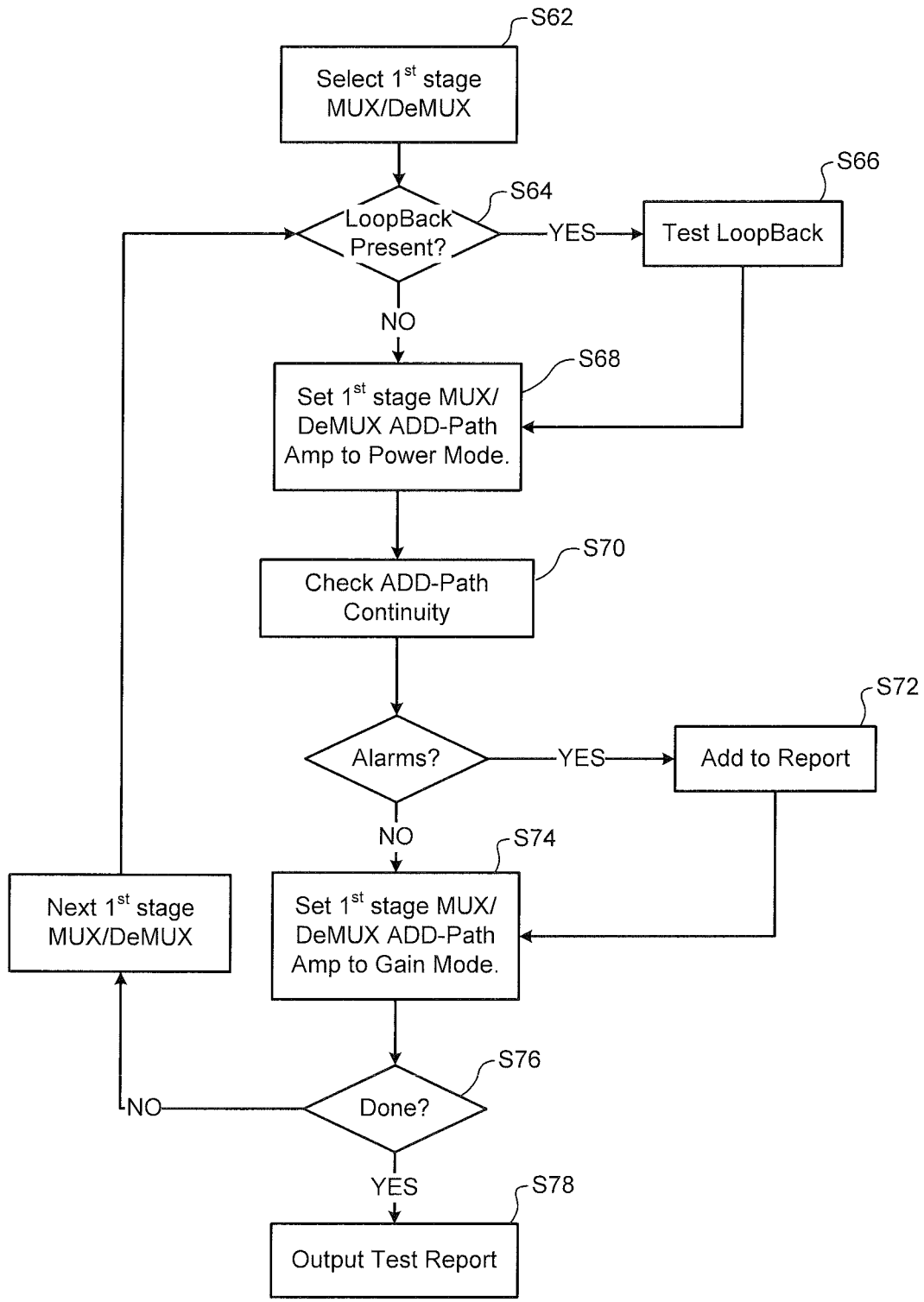
FIG. 7 is a flow chart illustrating a representative testing method in accordance with an aspect of the present invention.

FIG. 7 illustrates a representative method for automated testing of the ROADM/DIA ADD-path within a network node. As may be appreciated, this process may be suitable for testing DIA cards that have been installed in the node, but which are not currently ADDing active wavelength channels. A first stage MUX/DeMUX module 12 is selected (step (S62) for testing. If the attached second-stage MUX/DeMUX module 10 contains a LoopBack Path (step S64), the module 10 can be controlled to perform a test (step S66) of that path. Then, the ADD-Path amplifier 52 in a selected first stage MUX/DeMUX module 12 can be set to power control mode (step S68) so as to generate ASE light at its output. This ASE light can then be used to check (step S70) ADD-path continuity through the ROADM 2 and the DIA 34. For example, detection of the ASE light in the 2-port OPM 50 confirms connectivity between the selected first stage MUX/DeMUX module 12 and the second stage MUX/DeMUX module 10. Similarly, detection of the ASE light at the Common-In port of the DIA WSS 38 confirms ADD-path continuity through the ROADM 2 to the DIA 34. Similarly, the optical power levels detected at the 2-port OPM 50, DIA OPM 46 and the Common-In port of the DIA WSS 38 can be used as described above to identify unexpected losses in the ADD-path. If any alarm conditions are found (step S70) during the ADD-path continuity test, information regarding these alarms is inserted (at step S72) into the test report. Upon completion of the ADD-path test for the selected first stage MUX/DeMUX module 12, the module's ADD-path amplifier 52 is placed into the Gain control mode, to minimize ASE at its output.

The process described above at steps S64-S74 is repeated for each first stage MUX/DeMUX module 12 in the network node. Once all of the first stage MUX/DeMUX modules have been tested (step S76) the test report may be output (at step S78) to a printer, display or storage device, for example. Preferably, this report includes information detailing any errors or alarm states detected during the test operations described above with reference to FIGS. 3-7.

As will be appreciated, the automated node-level fiber testing and evaluation methods described above, can be run at various times, as desired. For example, during System Layout and Testing (SLAT), the automated node-level fiber testing and evaluation process may be run to validate any new connections being installed. Subsequently, the process may be run (for example "on Demand", or in accordance with a predetermined schedule) to verify proper connectivity and optical performance within the node.

The embodiments of the invention described above are intended to be illustrative only. The scope of the invention is therefore intended to be limited solely by the scope of the appended claims.

We claim:

1. A method of automated testing and evaluation of a node of a communications network, the method comprising:
    a management computer querying the node to discover pre-existing fibre trails within the node that can be safely tested, wherein the querying comprises obtaining a listing of one or more equipment associated with the node, wherein the listing is stored in a database associated with the node, and the listing identifies port layer and addresses, photodiode locations and addresses and Amplified Spontaneous Emission (ASE) sources of the one or more equipment; and
    the management computer interacting with the node to test, by adding a light source at the node that does not impact other in service wavelengths, at least continuity of each identified pre-existing fibre trail that can be safely tested.

2. The method of claim 1, wherein the method is performed in response to a request.

3. The method of claim 1, wherein the method is performed in accordance with a predetermined schedule.

4. The method of claim 1, wherein discovering pre-existing fibre trails within the node that can be safely tested comprises deriving a map of preexisting fibre trails within the node that are not in use carrying active wavelengths.

5. The method of claim 4, wherein deriving a map of pre-existing fibre trails within the node that are not in use carrying active wavelengths comprises:
    obtaining information identifying each piece of equipment installed in the node;
    for each identified piece of equipment, obtaining information identifying respective ports, photodiodes and Amplified Spontaneous Emission (ASE) sources;
    identifying port trails of active wavelengths;
    identifying dark photodiodes;
    identifying ASE sources upstream of identified dark photodiodes; and
    identifying, from among the ASE sources upstream of dark photodiodes, those ASE sources that can be safely turned on.

6. The method of claim 5, wherein dark photodiodes include any one or both of receivers and Optical Performance Monitoring (OPM) devices of the node that are not receiving light of an active wavelength.

7. The method of claim 1, wherein testing at least continuity of each identified pre-existing fibre trail that can be safely tested comprises:
    turning on a selected ASE source in an identified pre-existing fibre trail, and
    detecting light from the ASE source at a dark photodetector downstream of the selected ASE source.

8. A non-transitory computer readable storage medium comprising software instructions implementing an automated testing and evaluation of a node of a communications network, the software instructions comprising:
    instructions for controlling a management computer to query the node to discover preexisting fibre trails within the node that can be safely tested, wherein the querying comprises obtaining a listing of one or more equipment associated with the node, wherein the listing is stored in a database associated with the node, and the listing identifies port layer and addresses, photodiode locations and addresses and Amplified Spontaneous Emission (ASE) sources of the one or more equipment; and
    instructions for controlling the management computer to interact with the node to test, by adding a light source at the node that does not impact other in service wavelengths, at least continuity of each identified pre-existing fibre trail that can be safely.

9. The non-transitory computer readable storage medium of claim 8, wherein the software instructions for discovering pre-existing fibre trails within the node that can be safely tested comprises software instructions configured to derive a map of pre-existing fibre trails within the node that are not in use carrying active wavelengths.

10. The non-transitory computer readable storage medium of claim 9, wherein the software instructions configured to derive a map of pre-existing fibre trails within the node that are not in use carrying active wavelengths comprises instructions configured to control the management computer to:
    obtain information identifying each piece of equipment installed in the node;
    for each identified piece of equipment, obtain information identifying respective ports, photodiodes and Amplified Spontaneous Emission (ASE) sources;
    identify port trails of active wavelengths;
    identify dark photodiodes;
    identify ASE sources upstream of identified dark photodiodes; and identify, from among the ASE sources upstream of dark photodiodes, those ASE sources that can be safely turned on.

11. The non-transitory computer readable storage medium of claim 10, wherein dark photodiodes include any one or both of receivers and Optical Performance Monitoring (OPM) devices of the node that are not receiving light of an active wavelength.

12. The non-transitory computer readable storage medium of claim 8, wherein testing at least continuity of each identified fibre trail that can be safely tested comprises turning on a selected ASE source in an identified fibre trail, and detecting light from the ASE source at a dark photodetector downstream of the selected ASE source.

13. A management computer configured to implement automated testing and evaluation of a node of a communications network, the management computer being configured to:
  query the node to discover pre-existing fibre trails within the node that can be safely tested, wherein the query comprises obtaining a listing of one or more equipment associated with the node, wherein the listing is stored in a database associated with the node, and the listing identifies port layer and addresses, photodiode locations and addresses and Amplified Spontaneous Emission (ASE) sources of the one or more equipment; and
  interact with the node to test, by adding a light source at the node that does not impact other in service wavelengths, at least continuity of each identified pre-existing fibre trail that can be safely tested.

14. The management computer of claim 13, wherein the management computer is a central management computer remote from the network node.

15. The management computer of claim 13, wherein the management computer is a management computer of the network node.

16. The management computer of claim 13, wherein the management computer is configured to discover pre-existing fibre trails within the node that can be safely tested by deriving a map of pre-existing fibre trails within the node that are not in use carrying active wavelengths.

17. The management computer of claim 16, wherein deriving a map of pre-existing fibre trails within the node that are not in use carrying active wavelengths comprises:
  obtaining information identifying each piece of equipment installed in the node;
  for each identified piece of equipment, obtaining information identifying respective ports, photodiodes and Amplified Spontaneous Emission (ASE) sources;
  identifying port trails of active wavelengths;
  identifying dark photodiodes;
  identifying ASE sources upstream of identified dark photodiodes; and
  identifying, from among the ASE sources upstream of dark photodiodes, those ASE sources that can be safely turned on.

18. The management computer of claim 17, wherein dark photodiodes include any one or both of receivers and Optical Performance Monitoring (OPM) devices of the node that are not receiving light of an active wavelength.

19. The management computer of claim 13, wherein the management computer is configured to test at least continuity of each identified preexisting fibre trail that can be safely tested by turning on a selected ASE source in an identified pre-existing fibre trail, and detecting light from the ASE source at a dark photodetector downstream of the selected ASE source.

* * * * *